Dec. 28, 1937.   C. C. FARMER   2,103,355
INSECT EXCLUDER
Filed April 23, 1937
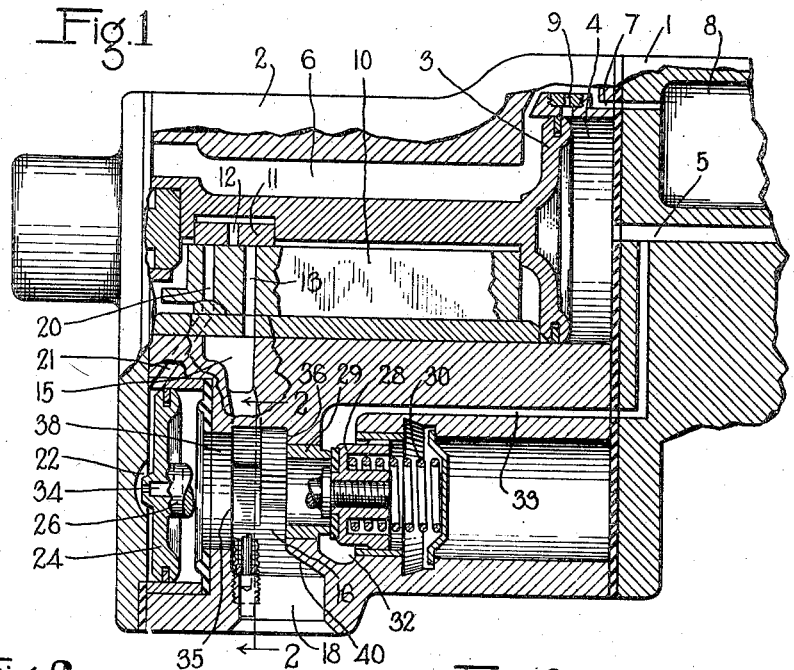
Fig. 1
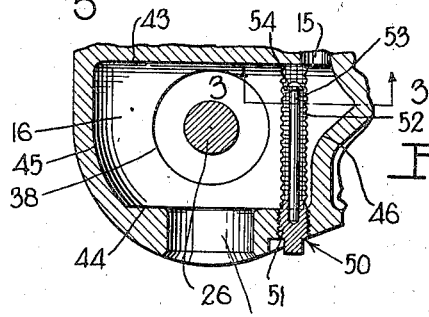
Fig. 2
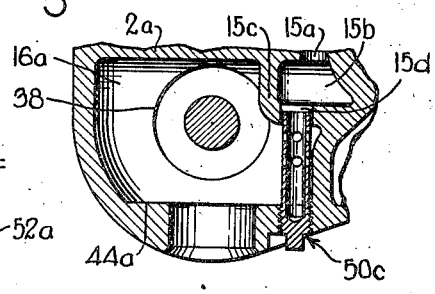
Fig. 6
Fig. 4
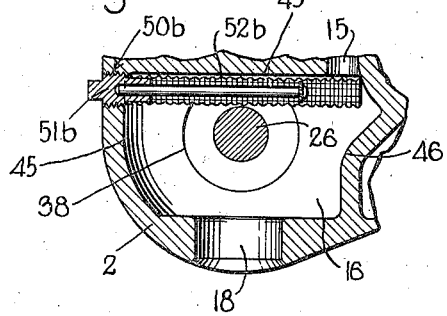
Fig. 5
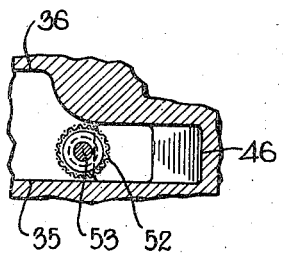
Fig. 3
INVENTOR
CLYDE C. FARMER
BY *Wm. A. Cady*
ATTORNEY Patented Dec. 28, 1937

2,103,355

UNITED STATES PATENT OFFICE 2,103,355

INSECT EXCLUDER

Clyde C. Farmer, Pittsburgh, Pa., assignor to The Westinghouse Air Brake Company, Wilmerding, Pa., a corporation of Pennsylvania Application April 23, 1937, Serial No. 138,570

17 Claims. (Cl. 303—1)

This invention relates to a vehicle brake equipment and more particularly to means adapted to be associated with the vent passage in a brake controlling valve device which is open to the atmosphere to prevent the vent passage from being closed or partially restricted by dirt or foreign matter deposited therein by insects or otherwise.

It is an object of this invention to provide improved means to protect a vent passage in a brake controlling valve device.

A further object of the invention is to provide protecting means for preventing the closure of a passage by the deposit of foreign material therein by insects or otherwise, this protecting means being adapted to be applied to valve devices now in service.

Another object of the invention is to provide protecting means of the type described which is designed so that the release of fluid from the passage sought to be protected will not be easily impaired by the deposit of mud or other foreign material on the protecting means.

A further object of the invention is to provide improved protecting means of the type described which is simple and inexpensive to construct and install, and which is efficient in operation.

Other objects of the invention and features of novelty will be apparent from the following description taken in connection with the accompanying drawing, in which Fig. 1 is a sectional view of a portion of a brake controlling valve device equipped with one form of protecting means provided by this invention, portions of the valve device and protecting means being broken away to more completely disclose other portions of the valve device, Fig. 2 is a sectional view taken substantially along the line 2—2 on Fig. 1, Fig. 3 is a sectional view taken substantially along the line 3—3 on Fig. 2, Fig. 4 is a view of a modified form of protecting means which I may employ, Fig. 5 is a view similar to Fig. 2, but showing a somewhat different form of protecting means embodying this invention, and Fig. 6 is a fragmentary sectional view similar to Fig. 2, but showing a modified form of construction embodying this invention.

In Fig. 1 of the drawing there is illustrated a portion of a brake controlling valve device of the type with which the vent passage protector provided by this invention is adapted to be employed. The device shown in the drawing is of the type shown in U. S. Patent No. 2,031,213, issued February 18, 1936, and includes a pipe bracket section 1 and an emergency section 2.

The emergency section 2 comprises a body having a bore therein, in which is mounted a piston 3 having at one side a chamber 4 connected by way of a passage 5 in the pipe bracket section 1 to the brake pipe, not shown. The piston 3 has at the other side a valve chamber 6 which is constantly connected by way of a passage 7 with a quick action chamber 8 formed in the pipe bracket section 1. The valve chamber 6 and the quick action chamber 8 are adapted to be charged with fluid under pressure supplied from the brake pipe through a restricted port 9 controlled by the piston 3.

A main slide valve 10 and an auxiliary slide valve 11 having movement relative to the main slide valve are mounted in the valve chamber 6, and are operated by means of the piston 3.

In operation the emergency piston 3 is adapted to respond to a service reduction in brake pipe pressure in the chamber 4 and moves the slide valve 11 relative to the main slide valve 10 to a service position in which a port 12 through the auxiliary slide valve 11 registers with a port 13 through the main slide valve 10, while in this position of the main slide valve 10 the port 13 registers with an exhaust passage 15 formed in the body of the emergency section 2 and communicating with an exhaust or vent chamber 16 which is open to the atmosphere through a relatively large exhaust or vent opening 18.

Upon movement of the auxiliary slide valve 11 to the service position, fluid under pressure is released from the valve chamber 6, and the quick action chamber 8, at a rate sufficient to reduce the pressure of the fluid in these chambers substantially as rapidly as the pressure of the fluid in the chamber 4 at the face of the piston 3 is reduced on a service reduction in brake pipe pressure to thereby prevent sufficient differential being developed between the pressures in the valve chamber 6 and in the brake pipe chamber 4 to cause the piston to be moved to the emergency application position.

Upon an emergency reduction in brake pipe pressure in the piston chamber 4, the piston 3 operates to move the auxiliary slide valve 11 to an emergency position in which a port 20 through the main slide valve 10 is uncovered so that fluid under pressure from the valve chamber 6 flows through this port to a passage 21 which leads to a chamber 22 at one face of a vent valve piston 24 which is mounted in a bore in the body of the emergency section 2.

The piston 24 has a stem 26 formed integral therewith and extending across the vent chamber 16, while the stem 26 has secured on the end thereof a vent valve 28 adapted to engage an annular seat rib formed on a bushing 29 which is mounted in a bore in the body of the emergency section 2. The seat rib on the bushing 29 surrounds a passage open to the vent chamber 16. The vent valve 28 is yieldingly held in the seated position by means of a coil spring 30, while the vent valve 28 is mounted in a chamber 32 which is constantly connected by way of a passage 33 with the brake pipe passage 5.

On an increase in the pressure of the fluid in the chamber 22 force is exerted on the vent valve piston 24 to move it to the right, as viewed in Fig. 1 of the drawing, and on this movement of the vent valve piston 24, force is exerted through the piston stem 26 to move the vent valve 28 against the opposing force of spring 30, and thereby open a communication between the chamber 32 and the vent chamber 16 through which fluid under pressure supplied from the brake pipe passage 5 to the chamber 32 is released to the vent chamber at a rapid rate.

Fluid under pressure supplied to the chamber 22 at the face of the vent valve piston 24 is gradually released therefrom through a restricted passage 34 through the piston 24, and on a reduction in the pressure of the fluid in the chamber 22 to a predetermined relatively low value, the force exerted thereby on the piston 24 is insufficient to hold the vent valve 28 against the opposing force of the spring 30, and the vent valve 28 is thereupon moved by the spring 30 into engagement with the seat rib on the bushing 29 to cut off communication between the brake pipe and the atmosphere through the vent chamber 16.

As constructed the vent opening 18 and the vent chamber 16 in the emergency section 2 are relatively large in size to permit fluid under pressure to be vented from the brake pipe to the atmosphere at a rapid rate in effecting an emergency application of the brakes. As these portions are relatively large in size, insects, wasps, or the like, may enter the vent chamber and deposit mud or similar material in this chamber.

If mud or other material is deposited in the vent chamber 16 it may completely or partially restrict the release of fluid under pressure through the discharge passage 15, thereby interfering with the intended operation of the valve device on a service application of the brakes.

In the emergency section of the valve devices as constructed at present, the vent chamber 16 has spaced, substantially parallel end walls 35 and 36. The wall 35 has a circular opening 38 substantially centrally thereof through which the vent valve piston stem 26 extends, while this wall separates the vent chamber 16 from the bore in which the vent valve piston 24 is mounted. The wall 36 of the vent chamber 16 has an opening therein opposite the opening 38 in the wall 35, and the bushing 29 is secured in this opening.

The lower portion of the vent chamber 16 is open to the atmosphere through the vent opening 18 which is somewhat larger in diameter than the distance between the end walls 35 and 36 of the vent chamber 16. The lower portion of the wall 36 is cut away, as indicated at 40, to provide for free flow of fluid from the vent chamber 16 to the vent opening 18.

The end walls 35 and 36 are joined by a top wall 43, a bottom wall 44, and side walls 45 and 46. The end wall 36 and the side wall 46 are curved, as is best shown in Fig. 3 of the drawing, and forms a portion of reduced width adjacent an upper corner of the vent chamber 16. The discharge passage 15 communicates with this portion of the vent chamber.

The form of protecting means provided by this invention and shown in Figs. 1, 2 and 3 of the drawing, is indicated generally by the reference numeral 50 and comprises a threaded member 51 adapted to be secured in a threaded hole formed in the bottom wall 44 of the vent chamber 16. The member 51 carries a tubular portion 52 formed of any suitable material, such as wire screen, which is secured to the member 51 by suitable means, such as soldering. A rod 53 is mounted within the tubular portion 52 and is secured to the member 51. The rod 53 carries a disc or washer 54 which engages and supports the end of the tubular portion 52 remote from the member 50.

The entire assembly comprising the member 51 and the tubular portion 52 is adapted to be inserted in position from the exterior of the body of the valve device, while the member 50 has a square end portion thereon adapted to receive a wrench so that the member 51 may be tightened in the threaded opening in the body of the emergency section 2.

The tubular portion 52 associated with the member 51 is of a diameter slightly smaller than the distance between the end walls 35 and 36 in the narrow portion of the vent chamber 16, as is best shown in Fig. 3 of the drawing, while the tubular portion 52 is of a length sufficient to extend from the bottom of the vent chamber 16 substantially to the upper wall 43 thereof, as is best shown in Fig. 2 of the drawing.

When the protecting means is in position in the vent chamber 16, the tubular portion 52 separates the vent chamber into two parts, and prevents access from the portion of the vent chamber open to the relatively large vent opening 18 to the portion of the vent chamber open to the discharge passage 15.

As the protecting means provided by this invention prevents access to the relatively narrow portion of the vent chamber, to which is connected the discharge passage 15, insects, wasps, or the like, which enter the vent chamber 16 cannot deposit mud, or other foreign material in the vent chamber in such a manner as to restrict the flow of fluid under pressure from the discharge passage 15.

As the tubular portion 52 is formed of wire screen, it readily permits fluid supplied to the discharge passage 15 to flow from this passage to the portion of the vent chamber 16 open to the atmosphere through the vent opening 18. Because of the relatively large surface area of the tubular portion 52, even if a part of the surface of this portion should be covered with mud or other foreign material, sufficient fluid under pressure may escape through other parts of the surface area and reach the portion of the vent chamber open to the atmosphere to permit free, unrestricted flow of fluid from the discharge passage 15.

It will be seen that the protecting means provided by this invention may be readily installed in valve devices now in service with the minimum of alteration in these devices. In order to install the protecting means, it is only necessary to form a threaded opening in the bottom wall 44 of the vent chamber 16, and then insert the protecting means.

It will be seen also that the protecting means provided by this invention may be readily removed for inspection or cleaning when desired, and that on removal it may thereafter be easily replaced.

In Fig. 4 of the drawing there is shown a modified form of the protecting means which I may employ in place of the form shown in Figs. 1, 2 and 3 of the drawing. This protecting means, which is indicated generally by the reference numeral 50a, comprises a member having a head portion provided with threads adapted to be received by a threaded opening in the bottom wall of the vent chamber 16. The head portion has formed integral therewith a hollow tubular portion 52a having a plurality of holes extending through the wall thereof. The tubular portion 52a is of substantially the same diameter as the tubular portion 52 of the form shown in Figs. 1, 2 and 3 of the drawing. The protecting means 50a is adapted to be employed in place of the protecting means 50, and in operation is substantially the same as that described in detail above.

In Fig. 5 of the drawing there is shown a modified form of construction which I may employ. In the form of construction shown in this figure, the protecting means, which is indicated generally by the reference numeral 50b, is similar to the form shown in Figs. 1, 2 and 3 of the drawing, and comprises a head member 51b to which is secured a tubular portion 52b formed of suitable material, such as wire screen. The protecting means shown in Fig. 5 is secured in a threaded opening formed in the side wall 45 of the vent chamber 16 at a point adjacent the upper wall 43. The protecting means 50b extends along the upper wall 43, and is of such length as to extend into the relatively narrow portion of the vent chamber with which the discharge passage 15 communicates.

In Fig. 6 of the drawing there is shown still another form of construction which I may employ. In this form of construction, the body of the emergency section, which is indicated at 2a, is slightly different in construction from the form shown in Fig. 1 of the drawing. The discharge passage 15a communicates with a discharge chamber 15b formed in the body of the emergency section 2a and separated from the vent chamber 16a by means of a wall 15c. The discharge chamber 15c is open to the vent chamber 16a by means of a passage 15d formed in the wall 15c.

The body of the emergency section 2a has a threaded opening formed in the bottom wall 44a at a point substantially opposite the opening 15d.

The protecting means employed in this form of construction is indicated generally by the reference numeral 50c, and is similar in construction to the form shown in Fig. 4 of the drawing. The protecting means 50c comprises a metallic member having a head portion which is threaded and is adapted to be received by the threaded opening in the lower wall 44a. The head portion has formed integral therewith a tubular portion slightly smaller in diameter than the passage 15d, and this tubular portion is of a length such that the end thereof is disposed within the passage 15d. The tubular portion has a plurality of openings therein, and on the supply of fluid under pressure to the discharge passage 15a, fluid flows to the chamber 15b and to the passage within the tubular portion of the protecting means 50c, from which it flows through the passages in the walls of the tubular portion to the vent chamber 16a, and thence to the atmosphere. Because of the relatively large number of openings in the tubular portion of the protecting means 50c, and because of the location of these holes at different points throughout the length of the tubular member, all of these holes will not be closed by mud or foreign material deposited on the protecting means. Hence fluid can always flow from the discharge passage 15a to the vent chamber 16a.

The form of protecting means shown in Fig. 6 of the drawing is adapted to be employed only with an emergency section, the body of which is constructed somewhat differently than those now in service. As a result, this form of construction cannot be employed with valve devices already in service.

While several embodiments of the improved insect excluder or protecting means provided by this invention have been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a vehicle fluid pressure brake equipment, in combination, a brake controlling valve device comprising a body having a vent chamber having a wall having a relatively large vent opening therein, said body also having a discharge passage therein opening to said vent chamber, said valve device incorporating means for releasing fluid under pressure through said discharge passage, and protecting means comprising a foraminous member secured in an opening in the wall of said vent chamber and substantially separating the portion of said vent chamber open to the vent opening from the portion of the vent chamber open to the discharge passage.

2. In a vehicle fluid pressure brake equipment, in combination, a brake controlling valve device comprising a body having a vent chamber having a wall having a relatively large vent opening therein, said body also having a discharge passage therein opening to said vent chamber, said valve device incorporating means for releasing fluid under pressure through said discharge passage, and protecting means comprising a foraminous member secured in an opening in the wall of said vent chamber and substantially separating the portion of said vent chamber open to the vent opening from the portion of the vent chamber open to the discharge passage, said member being adapted to be secured in position from the exterior of the body of said valve device.

3. In a vehicle fluid pressure brake equipment, in combination, a brake controlling valve device comprising a body having a vent chamber having a wall having a relatively large vent opening therein, said body also having a discharge passage therein opening to said vent chamber, said valve device incorporating means for releasing fluid under pressure through said discharge passage, a wall of said vent chamber having a threaded opening therein, and protecting means comprising a member secured in said threaded opening, said member having a foraminous portion extending into said vent chamber and substantially separating the portion of the vent chamber open to the vent opening from the portion of the vent chamber open to the discharge passage.

4. In a vehicle fluid pressure brake equipment, in combination, a brake controlling valve device comprising a body having a vent chamber having a wall having a relatively large vent opening therein, said body also having a discharge passage therein opening to said vent chamber, said valve device incorporating means for releasing fluid under pressure through said discharge passage, and protecting means comprising a hollow substantially tubular body formed of wire screen or the like mounted in said vent chamber and substantially separating the portion of the vent chamber open to the vent opening from the portion of the vent chamber open to the discharge passage.

5. In a vehicle fluid pressure brake equipment, in combination, a brake controlling valve device comprising a body having a vent chamber having a wall having a relatively large vent opening therein, said body also having a discharge passage therein opening to said vent chamber, said valve device incorporating means for releasing fluid under pressure to said discharge passage, a wall of said vent chamber having a threaded opening therein, a member secured in said opening, and a hollow tubular portion carried by said member and extending into said vent chamber, said portion substantially separating the portion of the vent chamber opening to the vent opening from the portion of the vent chamber open to the discharge passage.

6. In a vehicle fluid pressure brake equipment, in combination, a brake controlling valve device comprising a body having a vent chamber having a wall having a relatively large vent opening therein, said body also having a discharge passage therein opening to said vent chamber, said valve device incorporating means for releasing fluid under pressure to said discharge passage, a wall of said vent chamber having a threaded opening therein, a member secured in said opening, a hollow substantially tubular portion formed of wire screen carried by said member, said tubular portion extending into said vent chamber and substantially separating the portion of the vent chamber open to the vent opening from the portion of the vent chamber open to the discharge passage.

7. In a vehicle fluid pressure brake equipment, in combination, a brake controlling valve device comprising a body having a vent chamber having a wall having a relatively large vent opening therein, said body also having a discharge passage therein opening to said vent chamber, said valve device incorporating means for releasing fluid under pressure to said discharge passage, a wall of said chamber having a threaded opening therein, and protecting means substantially separating the portion of the vent chamber open to the vent opening from the portion of the vent chamber open to the discharge passage, said means comprising a member secured in said threaded opening, a hollow substantially tubular portion formed of wire screen carried by said member and extending into said vent chamber, and an element carried by said member and mounted within said tubular portion for supporting the end of the tubular portion remote from said member.

8. In a vehicle fluid pressure brake equipment, in combination, a brake controlling valve device comprising a body having a vent chamber therein having a wall having a relatively large opening therein, said body also having a discharge passage therein opening to said chamber at a point therein remote from said vent opening, the valve device incorporating means for releasing fluid under pressure to said discharge opening, a wall of said chamber having a threaded opening therein, and protecting means comprising a member secured in said threaded opening and extending into said vent chamber between the vent opening and the end of the discharge passage, said member substantially separating the portion of the vent chamber open to the vent opening from the portion of the vent chamber open to the discharge passage, said member being adapted to permit fluid to flow therethrough whereby fluid supplied to the discharge passage may reach the vent opening.

9. In a vehicle fluid pressure brake equipment, in combination, a brake controlling valve device comprising a body having a vent chamber therein provided with a wall having a relatively large vent opening therein, the valve device having a vent valve for releasing fluid through a vent passage formed in said body and communicating with said vent chamber at a point spaced from the vent opening, the valve device also incorporating means for releasing fluid through a discharge passage formed in said body and communicating with said vent chamber at a point spaced from the points of communication of said vent passage and said vent opening with said vent chamber, a wall of said chamber having a hole therein, and protecting means comprising a member secured in said hole and extending into said chamber, said member substantially separating the portion of the chamber open to the discharge passage from the portion of the chamber open to the vent passage and to the vent opening, said member being adapted to permit fluid under pressure to flow therethrough to thereby permit fluid flowing from the discharge passage to reach the vent opening.

10. In a fluid pressure brake equipment, in combination, a brake controlling valve device comprising a body having a vent chamber therein open to the atmosphere through a relatively large vent opening, said vent chamber having a portion of reduced width, the valve device incorporating means for releasing fluid to a discharge passage formed in said body and communicating with said vent chamber at a point in said chamber portion of reduced width, a wall of said chamber having a hole therein, a protecting means for said discharge passage comprising a member adapted to be secured in said hole, said member having a hollow substantially tubular portion formed of wire screen of a diameter slightly smaller than the distance between the wall of the vent chamber portion of reduced width, said tubular portion extending into said vent chamber portion of reduced width to separate the portion of the vent chamber open to the discharge passage from the portion of the vent chamber open to the vent opening.

11. In a fluid pressure brake equipment, in combination, a brake controlling valve device comprising a body having a vent chamber therein open to the atmosphere through a relatively large vent opening, said vent chamber having a portion of reduced width, the valve device incorporating means for releasing fluid to a discharge passage formed in said body and communicating with said vent chamber at a point in said chamber portion of reduced width, a wall of said chamber having a hole therein, and protecting means for said discharge passage comprising a member adapted to be secured in said hole, said member having a hollow tubular portion of a diameter slightly smaller than the distance between the walls of the vent chamber portion of reduced width, said hollow tubular portion extending into said vent chamber portion of reduced width to separate the portion of the vent chamber open to the discharge passage from the portion of the vent chamber open to the vent opening, the tubular portion of said member being adapted to permit fluid to flow therethrough, whereby fluid supplied to the discharge passage may reach the vent opening.

12. In a fluid pressure brake equipment, in combination, a brake controlling valve device comprising a body having a vent chamber therein open to the atmosphere through a relatively large vent opening, the valve device incorporating means for releasing fluid to a discharge passage formed in said body and communicating with said vent chamber, a wall of said chamber having a hole therein, a member mounted in said vent chamber and insertable therein through said hole, said member having a hollow tubular portion extending into the end of said discharge passage with the passage in said tubular portion open to said discharge passage, the wall of the tubular portion of said member having a plurality of openings therein through which fluid supplied to the passage in said member may flow to the vent chamber.

13. In a fluid pressure brake equipment, in combination, a brake controlling valve device comprising a body having a vent chamber therein open to the atmosphere through a relatively large vent opening, the valve device incorporating means for releasing fluid through a discharge passage communicating with said vent chamber at a point spaced from said vent opening, the wall of said vent chamber having a hole therein at a point opposite the point of communication of the discharge passage with the vent chamber, and a member having a hollow substantially tubular portion mounted in said hole and extending into the end of the discharge passage, the passage within said hollow tubular portion being open to the discharge passage, the wall of the tubular portion of said member having a plurality of openings therein to which fluid supplied to the passage in said tubular member may flow to the vent chamber.

14. In protecting means adapted to be employed in a brake controlling valve device of a type having a body provided with a vent chamber open to the atmosphere through a relatively large vent opening and incorporating means for releasing fluid through a discharge passage communicating with said vent chamber at a point spaced from said vent opening, the protecting means comprising a member adapted to be secured in an opening formed in a wall of said vent chamber, said member having associated therewith a hollow tubular portion adapted to extend into the vent chamber to prevent access to the portion of the vent chamber open to the discharge passage from the portion of the vent chamber open to the vent opening.

15. In protecting means adapted to be employed in a brake controlling valve device of a type having a body provided with a vent chamber open to the atmosphere through a relatively large vent opening and incorporating means for releasing fluid through a discharge passage communicating with said vent chamber at a point spaced from said vent opening, the protecting means comprising a member adapted to be secured in an opening formed in a wall of said vent chamber, said member having associated therewith a hollow tubular portion adapted to extend into the vent chamber to prevent access to the portion of the vent chamber open to the discharge passage from the portion of the vent chamber open to the vent opening, said hollow tubular portion being adapted to permit fluid to flow therethrough from the discharge passage to the portion of the vent chamber open to the vent opening.

16. In protecting means adapted to be employed in a brake controlling valve device of a type having a body provided with a vent chamber open to the atmosphere through a relatively large vent opening and incorporating means for releasing fluid through a discharge passage communicating with said vent chamber at a point spaced from said vent opening, the protecting means comprising a member adapted to be secured in an opening formed in a wall of said vent chamber, said member having secured thereto a substantially tubular portion formed of wire screen, said tubular portion being adapted to extend into said vent chamber to prevent access to the discharge passage from the portion of the vent chamber open to the vent opening.

17. In protecting means adapted to be employed in a brake controlling valve device of a type having a body provided with a vent chamber open to the atmosphere through a relatively large vent opening and incorporating means for releasing fluid to a discharge passage communicating with said vent chamber at a point spaced from said vent opening, the protecting means comprising a member adapted to be secured in an opening formed in a wall of said vent chamber, said member having secured thereto a substantially tubular portion formed of wire screen, said tubular portion being adapted to extend into said vent chamber to prevent access to the discharge passage from the portion of the vent chamber open to the vent opening, and an element carried by said member and positioned within said tubular portion for supporting the end of the tubular portion remote from said member.

CLYDE C. FARMER.